Dec. 30, 1952     G. X. LENS     2,623,404
CLUTCH AND SELECTING MECHANISM FOR MOVABLE PARTS
Filed Sept. 6, 1950     9 Sheets-Sheet 1

FIG. 1.

*Inventor*
GEORGES X. LENS

By *Robert Hardigg Jr.*
*Attorney*

Dec. 30, 1952 G. X. LENS 2,623,404
CLUTCH AND SELECTING MECHANISM FOR MOVABLE PARTS
Filed Sept. 6, 1950 9 Sheets-Sheet 2

Inventor
GEORGES X. LENS

By Robert Harding
Attorney

Dec. 30, 1952 G. X. LENS 2,623,404
CLUTCH AND SELECTING MECHANISM FOR MOVABLE PARTS
Filed Sept. 6, 1950 9 Sheets-Sheet 3

*Inventor*
GEORGES X. LENS

By *Robert F Harding Jr.*
*Attorney*

Dec. 30, 1952 G. X. LENS 2,623,404
CLUTCH AND SELECTING MECHANISM FOR MOVABLE PARTS
Filed Sept. 6, 1950 9 Sheets-Sheet 5

*Inventor*
GEORGES X. LENS

By Robert Harding
*Attorney*

Dec. 30, 1952  G. X. LENS  2,623,404
CLUTCH AND SELECTING MECHANISM FOR MOVABLE PARTS
Filed Sept. 6, 1950  9 Sheets-Sheet 7

Inventor
GEORGES X. LENS
By Robert F. Harding Jr.
Attorney

*Inventor*
GEORGES X. LENS

Patented Dec. 30, 1952

2,623,404

UNITED STATES PATENT OFFICE 2,623,404

CLUTCH AND SELECTING MECHANISM FOR MOVABLE PARTS

Georges Xavier Lens, Antwerp, Belgium, assignor to International Standard Electric Corporation, New York, N. Y., a corporation of Delaware Application September 6, 1950, Serial No. 183,445
In France September 22, 1949

8 Claims. (Cl. 74—469)

The present invention relates to a selecting and clutch mechanism for movable parts which can, for instance, be used in apparatus controlled by movable bars, such, for example, as various forms of crossbar switches, such as are well-known in the automatic telephone art.

One of the characteristics of the invention resides in a selecting and clutch mechanism for movable parts constituted by the combination of a selection lever subjected to the action of a driving device, of two clutch levers joined to the movable part or parts and each subjected to the action of a resilient device maintaining said levers in a rest position, said levers being placed under the control of the selection lever, and of a clutch bar, the operation of the selection lever having for effect to bring the two clutch levers under the control of the clutch bar, which, when actuated, either in one sense or in the other, causes by means of one of said clutch levers, the displacement of the movable part or parts, in one sense or the other, the other clutch lever, under the action of its resilient device, placing the movable part or parts into a clutch position, the clutch bar being then able to return to a rest position.

Another characteristic of the invention resides in the fact that each clutch lever comprises a clutch and hooking element by means of which, on one hand, the selection lever brings the said clutch lever under the control of the clutch bar, and on the other hand, places the movable part or parts in a clutch position, the said element coming to rest against the selection lever, and a driving element by means of which the clutch bar displaces the movable part or parts.

Another characteristic of the invention resides in the combination of two clutch levers constituted according to the above mentioned characteristic, the driving elements of the said levers being arranged in such a manner that for one sense of displacement of the clutch bar, the movable part or parts associated to the said levers are displaced by the action of the said clutch bar on the first of said levers and brought in a clutch position by the second lever, and for the other sense of displacement of the clutch bar, the movable part or parts are displaced by the action of the clutch bar upon the second lever and placed in a clutch position by the first lever.

Another characteristic of the invention resides in the fact that the clutch and hooking elements of the two clutch levers by means of which the movable part or parts are placed in a clutch position are staggered with respect to one another in order to permit the locking of the clutch.

Another characteristic of the invention resides in an actuating device for a selection lever, constituted by a part having an appropriate shape, mechanically joined to the movable armature of an electromagnet, one of the rounded ends of the said part being articulated in a slot with rounded edges provided in a part which is rigidly joined to said selection lever.

Another characteristic of the invention resides in a clutch bar, able to pivot around a longitudinal axis, either in one sense or the other, under the action of a driving device, the said bar showing two profiled parts, which in the rest position of the clutch bar, are placed in front of the spaces formed by the driving elements of the clutch levers, and in the clutch position of the said levers, are brought between the said driving elements, the rotation of the said bar in one sense or the other, driving the movable part or parts by means of the clutch lever or levers, previously placed in a clutch position.

Another characteristic of the invention resides in a driving device for the clutch bar constituted by the combination of a connecting rod mechanically joined to two movable armatures of electromagnets and being able to be displaced, either in one direction or the other, under the action of said electromagnets, of a crank mechanically joined to the clutch bar and provided with an axle which rotates freely in a part joined to the connecting rod and on which the said part can slide perpendicularly to the sense of displacement of the said connecting rod, the translating movement given to the connecting rod by one or the other electromagnet being thus transformed into a rotating movement and transferred to the clutch bar.

Another characteristic of the invention resides in a device constituted by a lever with two arms being able to pivot around a fixed point, each of the arms being placed in front of an element provided on a movable part in two opposite senses, in such a manner that the movable part being displaced in one direction or the other, the lever is driven by one or the other of said elements and always pivots around its resting point in the same sense.

Another characteristic of the invention resides in a combination of selecting and clutch mechanisms constituted by two groups of a certain number of said mechanisms located one above the other, each group being disposed to the left and to the right of the clutch bar common to all the mechanisms.

Another characteristic of the invention resides in the fact that the clutch bar can individually clutch a movable part or a group of movable parts, or several movable parts or groups of movable parts simultaneously, the said movable part or parts or groups of movable parts, having been previously brought into a clutch position.

Other characteristics will become more apparent from the following description which is given as a non-limitative example, with reference to the appended figures which represent.

It will now be described, by referring to Figs. 1 to 14, how according to an embodiment of the invention, a selecting and clutch mechanism for movable parts is realized.

This selecting and clutch mechanism for movable parts can be adapted to the selection and clutch of the horizontal bars of the mechanism described in the patent application filed by the applicant on March 24, 1950, application for United States Letters Patent Serial No. 151,593, now Patent No. 2, 589,267, for "Controlling or Selecting Mechanism."

Figure 1:
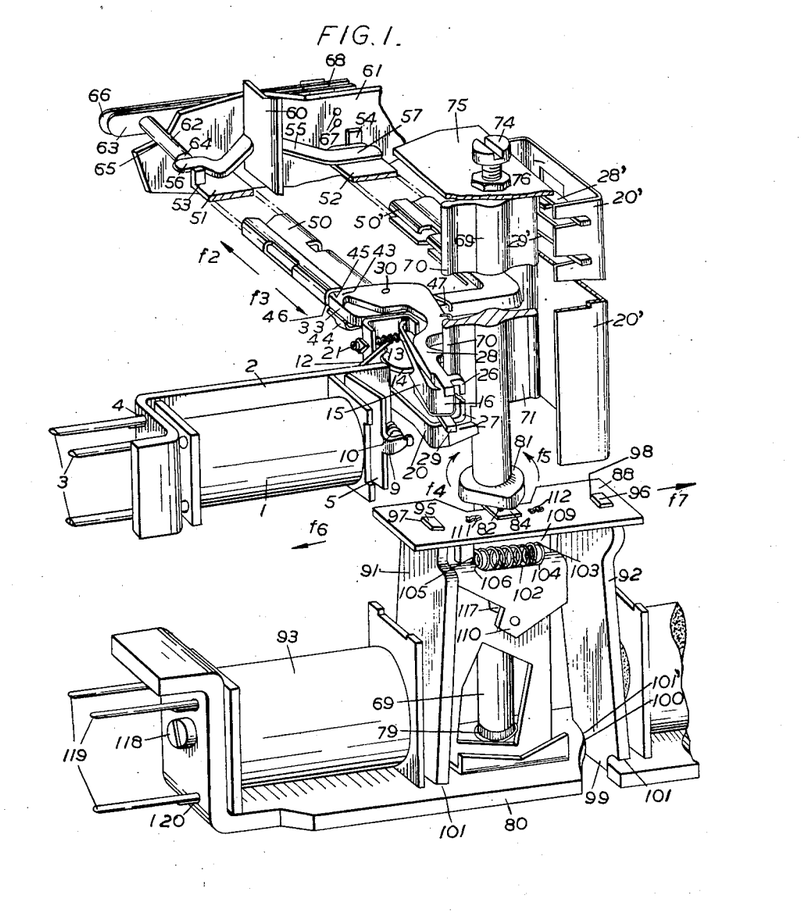
Fig. 1, a partial perspective view of an embodiment of a combination of selecting and clutch mechanisms according to the invention and on which only one selecting and clutch mechanism has been shown.

On Fig. 1, a combination of such mechanisms has been represented, only a single selecting and clutch mechanism being shown in order to clarify and to facilitate the understanding of the figure.

A selecting and clutch electromagnet 1 is fixed on a fixed supporting plate 2 having an L-shape by a screw, not shown. Terminals 3 provided to connect the windings of the coil of the electromagnet 1 to the electrical circuits, extend through the fixed plate 2 via holes 4 provided for the purpose.

Figure 2:
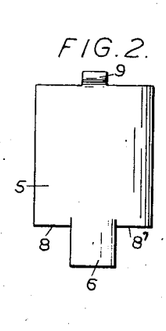
Fig. 2, a view of a movable armature of a selecting and clutch electromagnet.
Figures 3, 4:
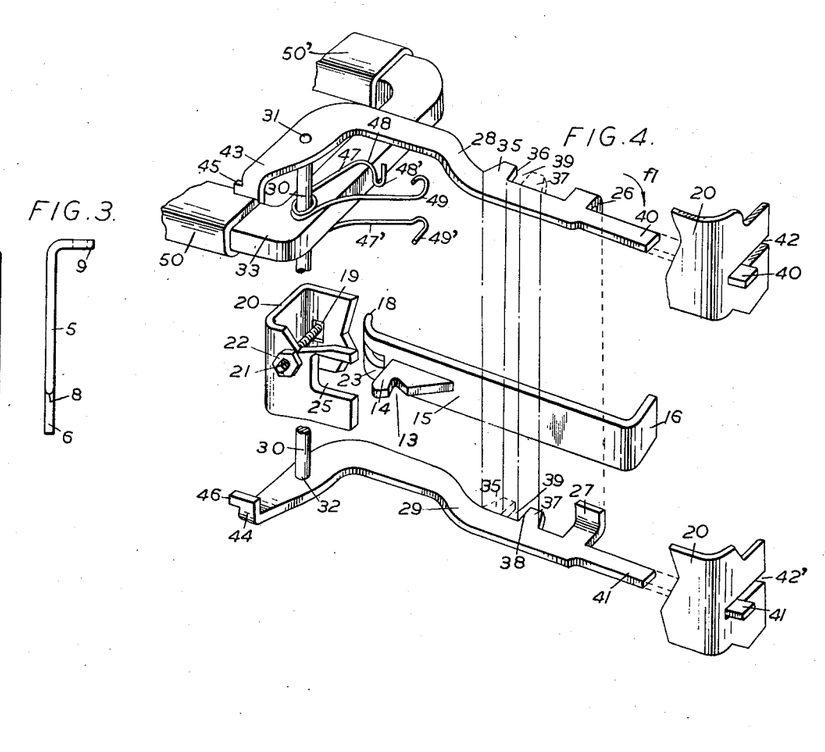
Fig. 3, a side view of Fig. 2.
Fig. 4, a perspective view showing the assembling of the clutch levers, of the selection lever and of the movable parts, the various parts being displaced from their normal position either in the vertical plane or in the horizontal plane.

The movable armature 5 of the electromagnet 1 is constituted by a metallic plate and comprises at its lower part a lug 6, as can be seen on Figs. 2 and 3. The lug 6 is engaged in an opening 7 (Fig. 14) provided in the supporting piece 2 and the armature 5 rests upon the said piece 2 by its two shoulder pieces 8 and 8', which are rounded to facilitate the articulation of the armature. The lower part of the armature 5 comprises a cut and bent grooved tag 9 upon which a return spring 10 is attached. The other end of the spring 10 is fixed by means of a strap 11 to the fixed piece 2 as shown on Fig. 14. The return spring 10 returns and holds the armature 5 in its rest position, the length of the air gap being determined by the width of the opening 7 against the edges of which the armature 5 is resting in its rest position.

Figure 7:
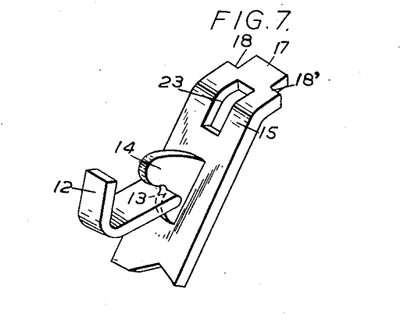
Fig. 7, a perspective view showing the articulation of the driving device for a selection lever.
Figure 8:
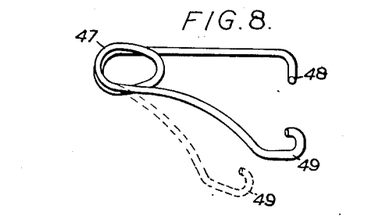
Fig. 8, a perspective view of a spring for a clutch lever.
Figures 14, 15:
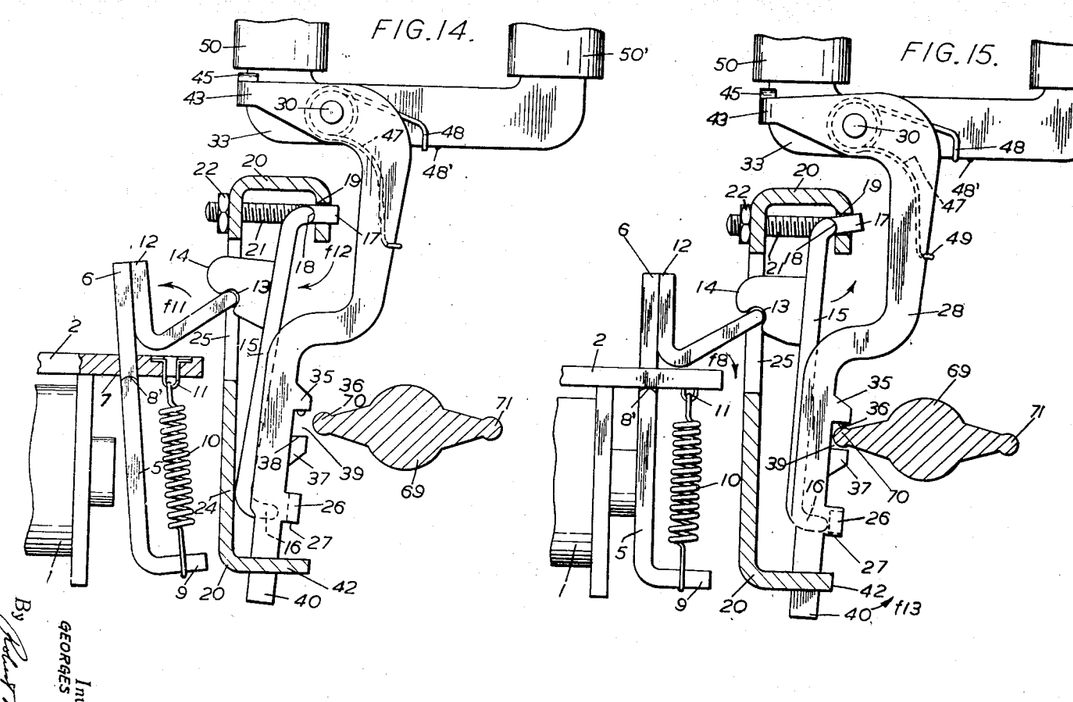
Fig. 14, a plan view of a selecting and clutch mechanism in the rest position.
Fig. 15, a plan view of a selecting and clutch mechanism placed in a clutch position.

A flat piece 12 bent in the shape of a V is soldered or fixed by any other appropriate means, by one of its branches, upon the lug 6 of the movable armature 5. The other branch of the piece 12 the end of which is rounded, is engaged in a notch 13, the edges of which are also rounded, of a piece 14 (Figs. 7 and 14). The piece 14 is mounted on and perpendicularly to a selection lever 15 (Fig. 5).

Figure 5:
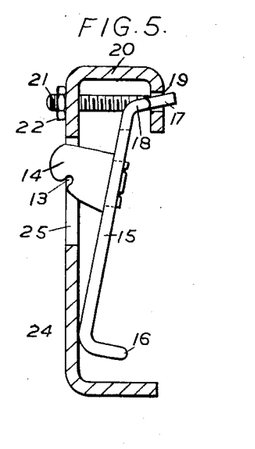
Fig. 5, a plan view of a selection lever, in the rest position, held in a fixed supporting piece.
Figure 6:
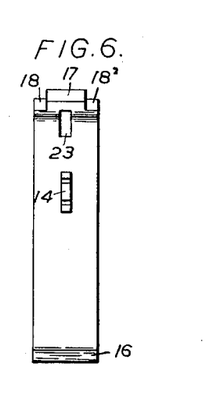
Fig. 6, a side view of a selection lever.

The selection lever 15 is represented on Fig. 5 in its rest position which it occupies in the mechanism, and on Fig. 6 as a side view. The said lever is constituted by a flat piece the rounded end 16 of which is bent in the shape of an L. The other end, bent as shown on Fig. 5, comprises a lug 17 and two shoulder pieces 18 and 18'. The lug 17 is inserted in an opening 19 provided in a fixed piece 20 and the two shoulder pieces 18—18' rest upon the inside face of piece 20; the said shoulder pieces having a rounded profile to facilitate the articulation of lever 15 upon its resting points.

An adjusting screw 21 screwed in the piece 20, provided with a locking nut 22, has its end inserted in a slot 23 of the lever 15 (Fig. 7). The said end comes to abut upon the rear of the lug 17 to prevent the said lug from being withdrawn from its lodging and to maintain the lever 15 upon its fulcrums 18—18'.

An opening 25 (Fig. 5) is provided in the fixed piece 20 to allow the insertion of the piece 14 rigidly mounted on the lever 15 and the piece 12 rigidly mounted on the armature 5.

Thus, it is seen that by means of the piece 12 articulated in the notch 13 of the piece 14, the selection lever 15 is rendered dependent upon the displacements of the movable armature 5 (Fig. 14). In the rest position, the lever 15 comes to abut against the inside face 24 of the fixed piece 20 by the heel of the end 16 of the said lever.

On Fig. 4, a perspective view of the assembly of the main parts of the mechanism has been shown, the said parts being displaced, in the vertical plane or in the horizontal plane, from their normal position in order to show them in full and to represent the manner in which they are dependent upon one another.

As can be seen on Fig. 1, the end 16 of the selection lever 15 is placed, in the rest position, in front of the inside part of two bent elements 26 and 27, called clutch hooks, of two clutch levers respectively labelled 28 and 29. The clutch hook 26 of the lever 28 has its end bent downwards while the hook 27 of the lever 29 has its end bent upwards.

The two clutch levers 28 and 29 constituted by a flat piece having an appropriate profile as represented on Fig. 4 or on Figs. 14, 15, 17 and 19, can rotate freely around a fixed axle 30 common to the two levers. The axle 30 goes through the two levers 28 and 29 via holes 31 and 32 respectively provided on the said levers. The levers 28 and 29 are arranged on both sides of a piece 33 having a U-shape, the axle 30 being fixed on the said piece 33 which it traverses at a right-angle.

Besides the clutch hook 26, the clutch lever 28 comprises a cut part 35, called a clutch finger, the side 36 of which is perpendicular to the straight side of the said lever 28.

Similarly, the clutch lever 29 comprises a clutch finger 37 the side 38 of which is perpendicular to the straight side of the said lever 29.

At the respective levels of the levers 28 and 29, the projections of the clutch finger 37 of the lever 29 and the projections of the clutch fingers 35 of the lever 28 have been shown in dotted line. In a plan view, the two fingers 35 and 37 delimit space 39, the usefulness of which will be demonstrated later.

The clutch hook 26 of the lever 28 is slightly displaced towards the left of the figure with respect to the clutch hook 27 of the lever 29 as shown by the projection in dotted line from one side of the hook 27 to the side of the hook 26 (Fig. 4).

The two ends 43 and 44 of the levers 28 and 29 are bent as represented on Fig. 4 and come to rest upon the edge of the piece 33. The said ends 43 and 44 are provided with a heel (such as 45 and 46) which is used to limit the displacement of the levers 28 and 29 during the assembly.

Each clutch lever 28 or 29 is subjected to the action of a resilient device constituted by a spring, such as 47, 47', the coils of which are coiled around the axle 30. One of the bent branches 48 of the said spring comes to rest against the piece 33, while the end, such as 49 and 49' of the other branch terminated by a hook, comes to rest against the outside profile of the lever to which the said spring is associated. Such a spring is represented on Fig. 8, the dotted line part representing the spring when stretched.

The action of the springs 47 and 47' tends to rotate respectively the levers 28 and 29 around the common axle 30 in the sense of the arrow $f_1$. This rotation is limited by the bottom of the notches, such as 42—42', provided in the fixed piece 20, upon which the ends 40 and 41 of the respective levers 28 and 29 come to rest in the rest position. The parts of the fixed piece 20 comprising the notches 42—42', have been displaced towards the right of the figure, the ends 40 and 41 of the levers 28 and 29 have been shown again.

The two branches of the piece 33 having a U-shape (Fig. 1) are inserted into horizontal bars 50 and 50' to be controlled, which can be displaced either in the sense of the arrow $f_2$ or in the sense of the arrow $f_3$, as will be described later.

At the other end of each of the horizontal bars 50 and 50' (Fig. 1), a flat piece such as 51 and 52 is fixed. Each of the said pieces comprises a cut and bent element forming an abutment (abutment 53 on piece 51 and abutment 54 on piece 52).

Figure 20:
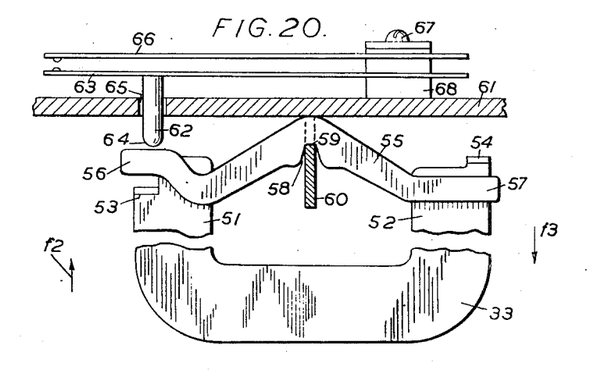
Fig. 20, a plan view of an actuating device for contact springs, associated with a group of movable parts, in the rest position.
Figure 21:
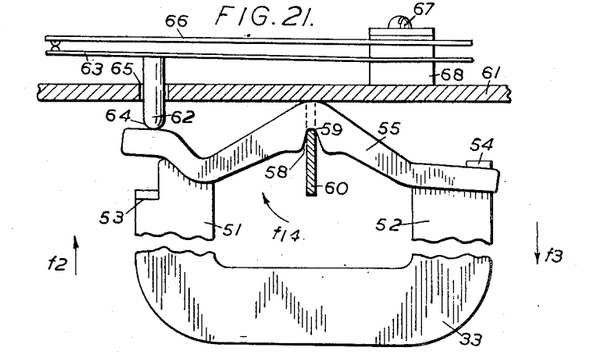
Fig. 21, a plan view of an actuating device for contact springs associated with a group of movable parts, the said movable parts having been displaced towards the bottom of the figure.
Figure 22:
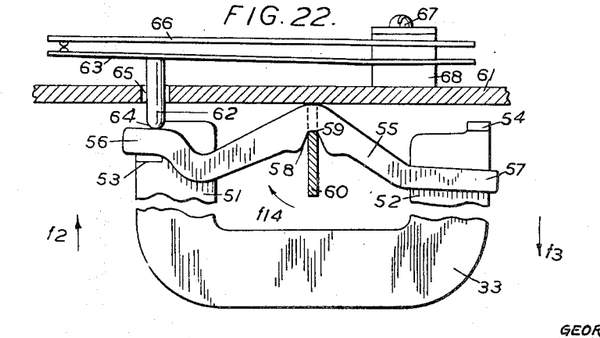
Fig. 22, a plan view of an actuating device for contact springs associated with a group of movable parts, the said parts having been displaced towards the upper part of the figure.

A flat piece 55, called swing-bar, having an appropriate profile as shown on Fig. 20, has its two ends 56 and 57 respectively located in front of the two abutments 53 and 54, the abutment 53 being located in front of the end 56 and the abutment 54 behind the end 57 (Fig. 1). The swing-bar 55 comprises, in its middle portion, a slot 58 with inclined edges and comes to rest by means of the bottom of the said slot upon the bottom part 59 of a slot provided in a vertical piece 60. The swing-bar 55 can pivot around its resting point 59, the amount of play at the joint being limited by a fixed part 61 placed at the rear of the swing-bar 55.

A pusher 62, mechanically joined to a spring contact 63, has its end 64 located in front of the rear side of the end 56 of the swing-bar 55. The pusher 62 goes through the fixed part 61 via an opening 65. A second contact spring 66 is located next to the spring 63, the contacts of the said springs being open in the rest position of the device.

The two contact springs 63 and 66 are fixed upon the fixed plate 61 by means of screws, such as 67, and insulating blocks, such as 68 (Fig. 20).

The selection and clutch mechanism which has been previously described, is associated with a main clutch bar 69.

Figure 9:
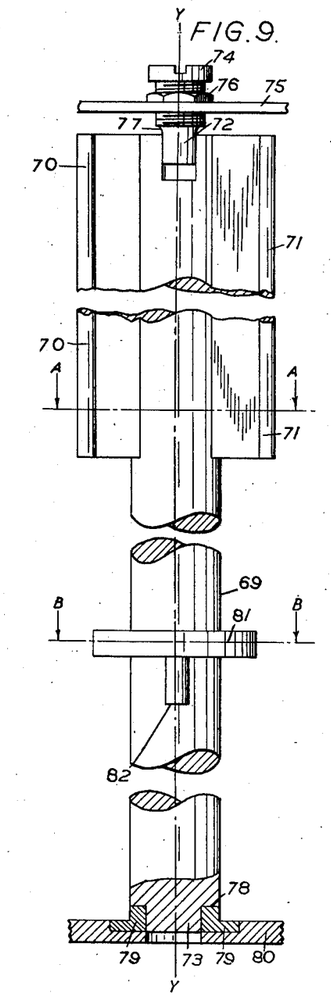
Fig. 9, a partial side view of the clutch bar.

The clutch bar 69 has been represented on Fig. 9, by a partial side view.

Figures 10, 11:
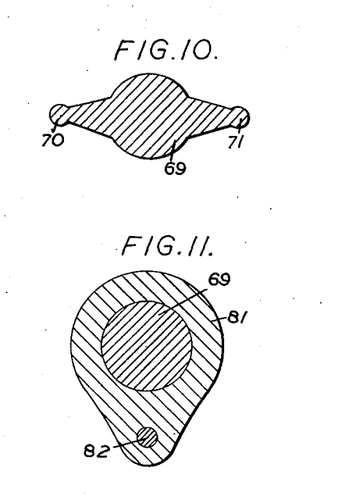
Fig. 10, a cut-out view along A—A of Fig. 9.
Fig. 11, a cut-out view along B—B of Fig. 9.

The upper and main part of the bar 69 is profiled as represented in Fig. 10 which is a cut-out view along A—A, on Fig. 9. It comprises a central cylindrical portion and two symmetrically and diametrically opposed profiled parts terminated by a cylindrical part 70 and 71.

The clutch bar 69 is movable and can pivot around the axis Y—Y (Fig. 9) around an upper axle 72 and a second lower axle 73, either in the sense of the arrow $f_4$ (Fig. 1) or in the sense of the arrow $f_5$.

The axle 72 is constituted by the smooth and cylindrical end of a screw 74. The said axle extends into the upper part of the bar 69 which forms a socket. The screw 74 is maintained screwed in a fixed piece 75 by a nut 76. A shoulder piece 77 is provided on the said screw 74 to adjust the amount of vertical play of the bar 69.

The lower end of the bar 69, which has a smaller diameter than the remainder of the said bar, constitutes the pivot 73; the shoulder piece 78 rests upon a bearing 79 fixed in the supporting plate 80, the bar 69 rotating freely upon the said bearing.

Figure 13:
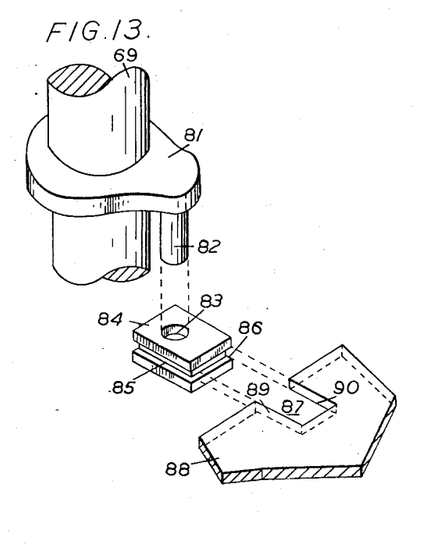
Fig. 13, a partial perspective view showing how the clutch bar is rendered dependent upon the connecting rod associated to the clutch electromagnets, the various parts being displaced from their normal position, either in the vertical plane or in the horizontal plane.

The clutch bar 69 is rendered dependent upon a driving device, which will be described later, by a crank 81 (Fig. 1) fixed on the lower cylindrical part of the said bar. The said crank 81 is constituted by a ring having an appropriate profile as represented in a cut-out view on Fig. 11 and is traversed by the bar 69. An arm of the crank 81 constituted by a cylindrical rod 82, is fixed vertically in the profiled part of the crank and directed downwards (Figs. 9 and 13).

The arm 82 of the crank is engaged in a cylindrical opening 83 (Fig. 13) provided in a piece 84. The said piece 84 has lateral grooves 85 and 86 and is engaged in a rectangular slot 87 of a connecting rod 88, the two sides 89 and 90 of the slot 87 being respectively engaged in the grooves 85 and 86.

The connecting rod 88 (Fig. 1), constituted by a rectangular plate, is mechanically dependent on two movable armatures 91 and 92 respectively belonging to the electromagnets 93 and 94, by the lugs 95 and 96 provided at the upper part of the movable armatures 91 and 92. The said lugs 95 and 96 are engaged in respective openings 97 and 98 provided in the connecting rod 88.

The movable armatures 91 and 92 are profiled in an appropriate manner as shown on Fig. 1; they each comprise at their lower part a lug 99 which is engaged in a rectangular opening 100 provided in the fixed supporting plate 80, the said armatures resting on the said plate 80 by means of two shoulder pieces 101—101'.

The connecting rod 88 transmits to the clutch bar 69 by means of the crank 81 and the arm 82, either the displacement of the movable armature 91 actuated by the electromagnet 93, or the displacement of the armature 92 actuated by the electromagnet 94.

The movable armatures 91 and 92 and the clutch bar 69 are subjected, by means of the connecting rod 88 and the crank 81, to the action of a resilient device which returns and maintains them in a well-determined rest position. This resilient device is constituted by a coiled spring 102 (Fig. 12) which comes to rest, by its two ends, flattened for that purpose, against the lateral sides 103, 104 and 105, 106 of two openings 107 and 108, provided in two pieces 109 and 110.

Figure 12:
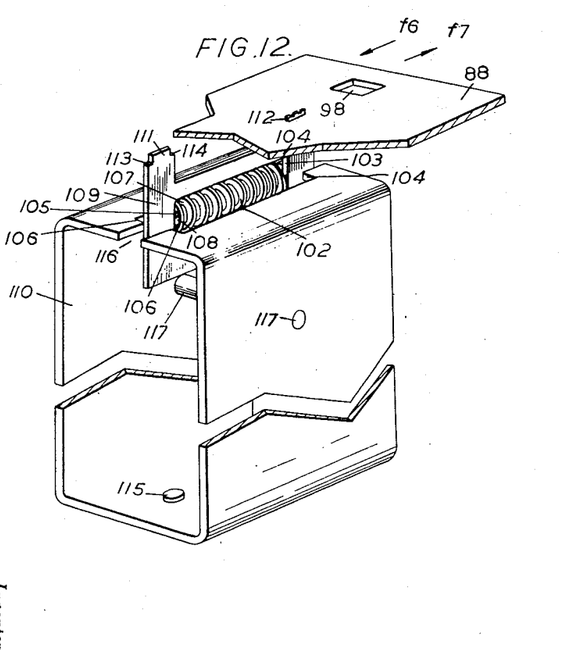
Fig. 12, a perspective view of the device for the return and the holding in the rest position of the clutch bar and of the movable armatures of the clutch electromagnets.

The piece 109, constituted by a flat piece, is fixed perpendicularly under the connecting rod 88 by two tags 111 and 112, each comprising two shoulder pieces 113 and 114. The end of the tags 111 and 112 is engaged in small holes provided in the connecting rod 88; a mounting upon the upper face of the connecting rod 88 ensures a rigid setting (Fig. 12).

The piece 110 is constituted by a flat piece having the form of a U and fixed on the fixed supporting plate 80 by means of screws such as 115. The ends of the two branches of the U are bent in the same plane towards the inside and with their edges form a groove 116 in which the piece 109 can be displaced. A riveted cross piece 117 maintains the spacing between the two lateral sides of the piece 110.

When the connecting rod 88 is displaced, e. g. in the sense of the arrow $f_6$ (Figs. 1 and 12), the piece 109 follows the displacement of the said connecting rod and the spring 102 is then compressed between the side 103 of the opening 107 in the piece 109 and against the side 106 of the opening 108 of the piece 110; the sides 104 of the piece 110, and 105 of the piece 109 are freed from the ends of the spring 102.

When the force which displaced the connecting rod ceases, the spring 102 expands and returns the piece 109 by exerting pressure against its side 103 in the sense of the arrow $f_7$ until the two ends of the spring 102 come again into contact on the one hand, with the side 104 of the opening 108 in the fixed piece 110, and on the other hand, with the side 105 of the opening 107 in the movable piece 109. The connecting rod 88 is then replaced in its predetermined rest position as well as the various pieces with which it is mechanically related, i. e. the two movable armatures 91 and 92 and the clutch bar 69.

When the connecting rod is displaced in the sense of the arrow $f_7$, the operation is similar.

The fixed supporting plate 80 has its two ends bent in the form of an L. The coils of the electromagnets 93 and 94 are fixed by means of screws such as 118 on the vertical ends of the supporting plate 80. The terminals 119 are provided to connect the windings of the coils of the electromagnets 93 and 94 to the electrical circuits, and extend through the supporting plate 80 via openings such as 120.

As briefly explained previously, only one selecting mechanism placed under the control of the electromagnet 1 and associated with a group of two horizontal bars 50—50', has been represented in the assembly shown on Fig. 1. A certain number of other similar mechanisms are arranged one on top of the other, the electromagnets being alternately located on one or the other side of the fixed pieces 20 and 20', inside of which the mechanisms and the clutch bar are located.

In Fig. 1, the mechanism shown is located on the left-hand side, the clutch levers 28 and 29 acting on the bars 50—50' by the left part of the piece 33 on which the said bars are fixed. The next mechanism, not shown, has its control electromagnet located on the right of the fixed piece 20', the clutch levers such as 28' and 29' acting on the horizontal bars with which they are associated, by the right-hand side of the piece similar to 33, on which the said bars are fixed. A third mechanism is located similarily with respect to the first mechanism and on top of the latter, on the left of the piece 20, etc.

All the selection and clutch mechanisms so arranged, are placed under the control of the common clutch bar 69. The profiled part 70 of the said bar is placed, in the rest position, in front of the space 39 formed by the clutch finger 35 of the lever 28 and the finger 37 of the lever 29 and of all the spaces formed between all the fingers, such as 35 and 37, of the clutch levers of the mechanisms located on the left-hand side. Similarly, the opposite part 71 of the bar 69 is placed in the rest position, in front of the space formed between the clutch fingers of the clutch levers of all the mechanisms placed on the right (Figs. 4 and 14).

The vertical piece 60 which is used as a resting point and as a guide for the swing-bar 55 is common for all the swing-bars associated with the horizontal bars such as 50—50'. The fixed piece 20 is common to all the mechanisms on the left-hand side, similarly the fixed piece 20' is common to all the mechanisms located on the right-hand side.

The operation of a selection and clutch mechanism will now be described with respect to Figs. 1 and 14–19.

On Figs. 1 and 14, the mechanism is shown in the rest position.

The movable armature 5 is maintained in the rest position by the spring 10 and maintains by means of the pieces 12 and 14, the selection lever 15 in the rest position, the said lever resting against portion 24 of the fixed piece 20.

The clutch levers 28 and 29, under the action of their respective springs 47 and 47', apply their ends 40 and 41 at the bottom of the slots 42 in the fixed piece 20; the heels 45 and 46 of the other ends are not yet in contact with the left horizontal bar 50.

The clutch bar 69 presents its profiled parts 70 and 71 in front of the spaces formed between the clutch fingers such as 35 and 37 of the mechanisms respectively located on the left and on the right, the movable armatures 91 and 92 being in the rest position.

When a selection electromagnet such as 1 is energized the movable armature 5 is attracted against the core of the said electromagnet. The said armature pivots on its rounded shoulder pieces 8—8', stretching the return spring 10. The piece 12, rigidly joined to the armature, also pivots in the sense of the arrow $f_8$ (Fig. 15) and drives, by means of its end, the piece 14, rigidly joined to the selection lever 15. The lever 15 pivots around its resting points 18—18' in the sense of the arrow $f_9$; the end 16 of the said lever comes into contact with the two clutch hooks 26 and 27 of the two corresponding levers 28 and 29. The said levers are thereby urged to pivot around the axle 30, in the sense of the arrow $f_{13}$, against the tension of their springs 47 and 47'. The ends 40 and 41 of the levers 28 and 29 leave the bottom of the slots 42 and the profiled part 70 of the clutch bar 69 is then placed in the space 39 between the clutch finger 35 of the lever 28 and the clutch finger 37 of the lever 29.

The mechanism is then in a clutch position as represented on Fig. 15.

It will be assumed that the selected horizontal bars 50—50' must be displaced in the sense of the arrow $f_2$ (Fig. 1).

The clutch electromagnet 93 is then energized. The movable armature 91 of the said electromagnet is attracted against the core of the electromagnet 93 and pivots around its rounded resting points 101—101'. By means of the lug 95 of the said armature 91, the connecting rod 88 is driven in the sense of the arrow $f_6$. The spring 102 is compressed as previously explained.

The displacement of the connecting rod 88 drives the crank arm 82 by means of the piece 84 the lateral grooves of which, 85 and 86, slide in the sides 89 and 90 of the slot provided in the connecting rod 88. By its movement, the crank arm 82 causes the rotation of the crank 81 and of the bar 69 integral therewith. The bar 69 pivots around its pivots 72 and 73 in the sense of the arrow $f_4$.

It should be noted that the combination of the crank arm 82 and the sliding piece 84 allows the translation of the lateral movement of the connecting rod 88 into a rotation of the bar 69. By referring to Fig. 16, it will be shown how the operation of the horizontal bars 50—50' is performed.

Figures 16, 17:
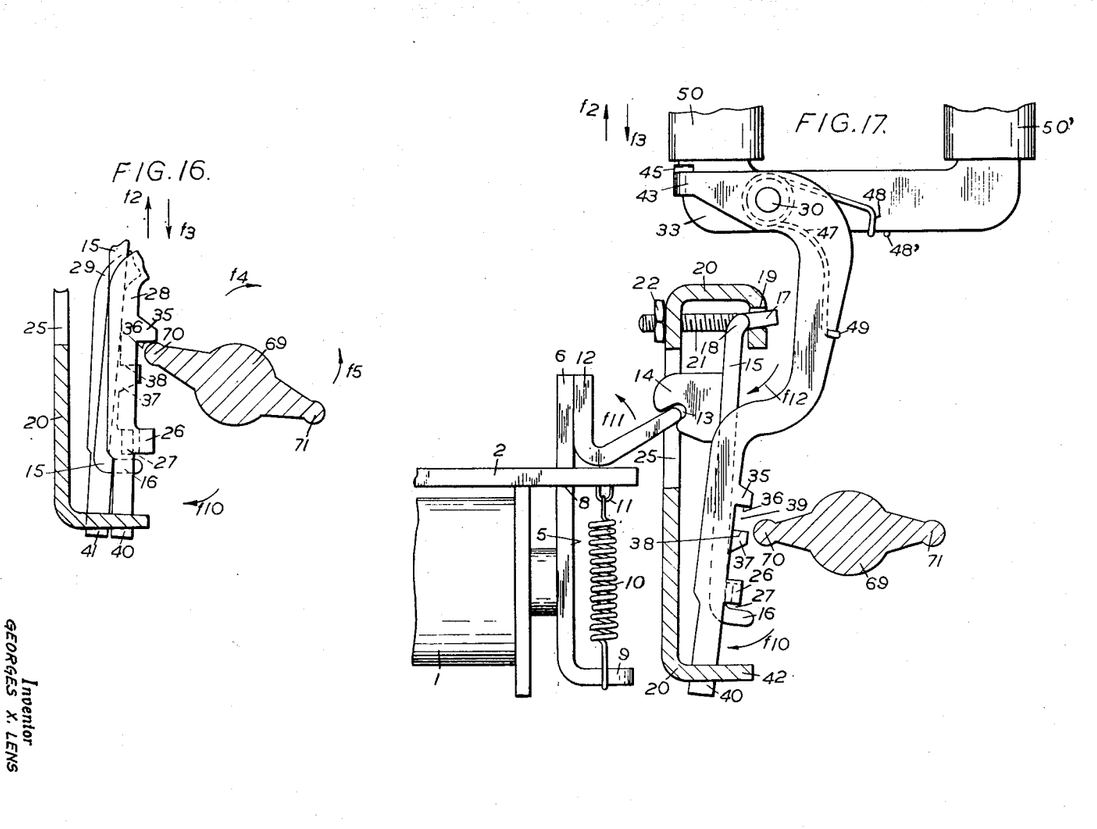
Fig. 16, a partial plan view of a selecting and clutch mechanism, when the clutch bar drives the movable parts associated to the said mechanism towards the upper part of the figure.
Fig. 17, a plan view of a selecting and clutch mechanism in a clutch position, the movable parts associated to the said mechanism having been displaced towards the upper part of the figure.
Figure 18:
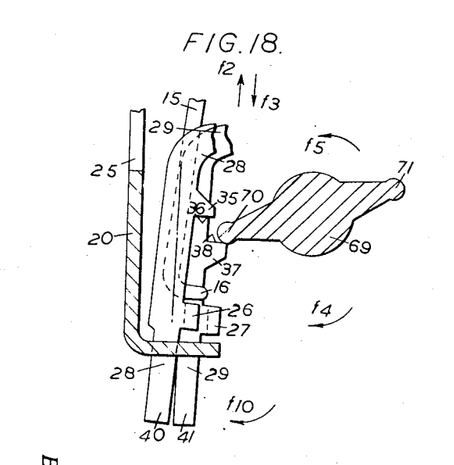
Fig. 18, a plan view of a selecting and clutch mechanism when the clutch bar drives the movable parts associated to the said mechanism towards the bottom part of the figure.

During its rotation in the sense of the arrow $f_4$, the bar 69 by its part 70 comes into contact with the side 36 of the clutch finger 35 and drives the lever 28 in the sense of the arrow $f_2$.

The horizontal bars 50—50' (Fig. 1) and the clutch lever 29 are dependent upon the displacement of the lever 28, by the axle 30, and are also displaced in the sense of the arrow $f_2$.

The two clutch hooks 26 and 27 of the levers 28 and 29 respectively, slide along the end 16 of the selecting lever 15 (Fig. 16). As soon as the hook 27 of the lever 29 overshoots the end 16 of the selecting lever 15, the spring 47' acts on the lever 29 which pivots around the axle 30 in the sense of the arrow $f_{10}$. The hook 27 is then placed behind the end 16 of the lever 15, thereby ensuring a positive locking during the operation. The end 41 of the lever 29 is stopped at the bottom of the slot 42' (Fig. 16) thereby limiting the displacement of the said lever 29 in the sense of the arrow $f_{10}$. The lever 28 is still in contact with the part 70 of the bar 69 by its finger 35, the restoring force of the spring 47 being less than the frictional force exerted between the finger 35 and the part 70.

When the horizontal bars 50—50' have travelled their full course, the energizing circuit for the clutch electromagnet 93 is interrupted (Fig. 1). The movable armature 91 is no longer maintained attracted against the core of the electromagnet 93; the return spring 102 expands, thereby returning the connecting rod 88 which is displaced in the sense of the arrow $f_7$ to its rest position, as previously indicated. The displacement of the said connecting rod 88 causes the rotation of the bar 69 in the sense of the arrow $f_5$ until it reaches its rest position.

As soon as the profiled part 70 of the bar 69 leaves the side 36 of the finger 35 (Fig. 16), the clutch lever 28, urged by its spring 47 is displaced in the sense of the arrow $f_{10}$ and places its hook 26 behind the end 16 of the lever 15. This displacement is limited by the end 40 of the lever 28 which stops at the bottom of the slot 42. Simultaneously, the assembly of the horizontal bars 50—50' and the levers 28—29, urged by the return device, not shown, is slightly displaced in the sense of the arrow $f_3$ (Fig. 1), until the hook 27 comes to rest against the back side of the end 16 of the selection lever 15.

It will be noted that the hook 26 of the lever 28 easily moves behind the end 16 of the lever 15 due to the said hook 26 being staggered with respect to the hook 27 of the lever 29, as previously indicated. Only the hook 27 is in contact with the end 16 of the lever 15 and is maintained hooked thereto, the return device, not shown, associated to the bars 50—50' exerting a thrust in the sense of the arrow $f_3$.

The horizontal bars 50—50' are then operated and the various pieces of the mechanism are in a clutch position as shown on Fig. 17.

When the energizing circuit of the selecting electromagnet 1 is interrupted, the movable armature 5 is no longer maintained attracted against the core of the said electromagnet. The restoring spring 10 returns the said armature 5 to the rest position. Simultaneously, the end of the piece 12 engaged in the groove 13 of the piece 14 pivots in the sense of the arrow $f_{11}$ (Figs. 14 and 17) and drives the selection lever 15 by means of the piece 14. The former pivots around its resting points 18—18', in the sense of the arrow $f_{12}$ until its heel comes into contact against portion 24 of the fixed piece 20.

The end 16 of the lever 15 slides against the side of the hook 27 and is disengaged from the said hook. As soon as the hook 27 of the lever 29 is disengaged from the end 16, the horizontal bars 50—50' are displaced in the sense of the arrow $f_3$ under the action of their return devices, not shown, and return to the rest position. The two clutch levers 28 and 29 are driven by the axle 30 and return also to the rest position.

The mechanism then occupies the position as represented on Fig. 14 or on Fig. 1.

The operation of the mechanism will now be described, with reference to Figs. 1, 14, 15, 18 and 19, when the horizontal bars 50—50' must be displaced in the sense of the arrow $f_3$.

The energization of the selecting electromagnet 1 causes the mechanism to be brought in a clutch position as previously explained. The said mechanism then occupies the position as shown on Fig. 15.

When the clutch electromagnet 94 (Fig. 1) is energized, the movable armature 92 is attracted against the core of the said electromagnet. By pivoting around its shoulder pieces 101—101', the said armature drives in its displacement the connecting rod 88 in the sense of the arrow $f_7$. The return spring 102 is stretched as previously explained. The displacement of the connecting rod 88 drives the crank arm 82 by means of the piece 84, the lateral grooves 85 and 86 of which slide along the sides 89 and 90 of the slot 87 provided in the connecting rod 88. By its movement, the crank arm 82 causes the rotation of its crank 81 and of the bar 69 joined thereto. The bar 69 rotates around its pivots 72 and 73 in the sense of the arrow $f_5$.

The profiled part 70 comes into contact with the side 38 of the clutch finger 37 (Fig. 18) and drives the lever 29 in the sense of the arrow $f_3$. The horizontal bars 50—50' and the lever 28 are also driven in the sense of the arrow $f_3$ by the axle 30. The two clutch hooks 26 and 27 slide along the end 16 of the lever 15. As soon as the hook 26 overshoots the end 16, the lever 28, under the action of its spring 47, pivots around its axle 30 in the sense of the arrow $f_{10}$. The end 40 of the lever 28 is stopped at the bottom of the slot 42 (Fig. 18), thereby limiting the displacement of the lever 28 in the sense of the arrow $f_{10}$.

The hook 26 of the lever 28 places itself in front of the end 16 of the lever 15, while the lever 29 remains in position, maintained by the clutch bar 69, the restoring force of the spring 47' being less than the frictional force exerted between the finger 38 and the profiled part 70.

As soon as the horizontal bars 50—50' have travelled their full course, the circuit of the electromagnet 94 is interrupted, which causes, under the action of the spring 102, which slackens, the return of the movable armatures 91 and 92, of the connecting rod 88 and of the clutch bar 69, to the rest position. The profiled part 70 now no longer acts against the side 38 of the finger 37 of the clutch lever 29; the said lever, under the action of its spring 47' pivots around the axle 30 in the sense of the arrow $f_{10}$ and places its hook 27 in front of the end 16 of the lever 15. The end 41 of the lever 29 stops at the bottom of the slot 42', thus limiting the displacement of the said lever in the sense of the arrow $f_{10}$.

Simultaneously, the assembly of the horizontal bars 50—50' and of the levers 28—29, solicited by the return device, not shown, is slightly displaced in the sense of the arrow $f_2$, until the hook 26 comes to rest against the front side of the end 16 of the lever 15.

As in the previous case, it will be noted that the hook 27 of the lever 29 easily places itself in front of the end 16 of the lever 15 due to the staggering of the hook 26 of the lever 28 with respect to the hook 27 of the lever 29.

The horizontal bars 50—50' are maintained in a clutch position only by the hook 26 of the lever 28, the return device for the said bars exerting a thrust against the end 16 by means of the hook 26 of the lever 28, in the sense of the arrow $f_2$.

Figure 19:
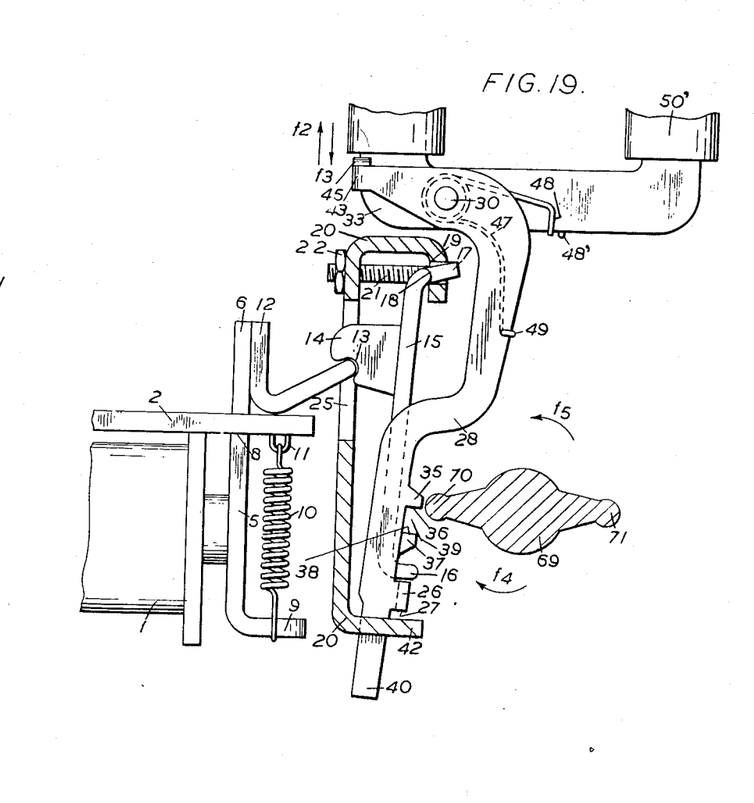
Fig. 19, a plan view of a selecting and clutch mechanism in a clutch position, the movable parts associated to the said mechanism having been displaced towards the bottom part of the figure.

The bars 50—50' thus operated, the mechanism occupies the position as shown on Fig. 19.

The mechanism returns to the rest position when the circuit of the electromagnet 1 is interrupted, in the same manner as previously described. As soon as the end 16 of the lever 15, after having been moved along the hook 26 of the clutch lever 28, is disengaged from the said hook, the horizontal bars 50—50', under the action of their return devices, not shown, return to the rest position, being displaced in the sense of the arrow $f_2$. The two clutch levers 28 and 29 are driven by the axle 30 and return also to the rest position.

The mechanism then occupies the position as shown on Fig. 14 or on Fig. 1.

The arrangement associated with each group of horizontal bars such as 50—50', allowing to control the contact springs when the bars are displaced either in the sense of the arrow $f_2$ or in the sense of the arrow $f_3$, will now be described with reference to Figs. 1 and 20–22.

The arrangement shown in perspective view on Fig. 1, at the end of the bars 50—50', and in plan view on Fig. 20, is then in the rest position. The two abutments 53 and 54 of the pieces 51 and 52, respectively associated with the bars 50—50', are placed in front of the respective ends 56 and 57 of the swing-bar 55 and do not exert any action on the said ends.

When the bars 50—50' are displaced in the sense of the arrow $f_3$ (Fig. 21) in the manner previously described, the abutment 54 comes into contact with the rear side of the end 57, while the abutment 53 is further separated from the end 56 of the swing-bar 55. The end 57 is driven by the abutment 54 and the swing-bar 55 pivots around its resting point 59 in the sense of the arrow $f_{14}$. By its rear side, the end 56 comes into contact with the end 64 of the pusher 62 and drives the said pusher in the sense of the arrow $f_2$, which causes the contact of the contact spring 63 to be brought against the contact of spring 66. An electrical circuit can thus be closed.

As soon as the bars 50—50' are returned to the rest position, as explained previously, the abutment 54 leaves the end 57 of the swing-bar 55 and the pusher 62 under the action of the contact spring 63, returns the swing-bar 55 approximately to its original position; the contact between the contact spring 63 and the contact spring 66 is open and the electrical circuit is again opened.

It will be noted that the swing-bar 55 has no well determined rest position and can come into contact by any of its ends against the corresponding abutment of one or the other bar; the said swing-bar does not then exert any action and does not hinder in any way the next operation.

If the bars 50—50' are displaced in the sense of the arrow $f_2$ (Fig. 22), the abutment 53 comes into contact with the front part of the end 56 of the swing-bar 55 while the abutment 54 is separated from the end 57.

The end 56 is driven and the swing-bar 55 pivots around its resting point 59 in the sense of the arrow $f_{14}$. As in the previous case, the rear part of the end 56 comes into contact with the end 64 of the pusher 62 which follows the displacement in the sense of the arrow $f_2$. The contact of the contact spring 63 which is integral with the said pusher is brought against the contact of the spring 66 thereby closing the electrical circuit.

As soon as the bars 50—50' are returned in the rest position, as explained previously, the abutment 53 leaves the end 56 of the swing-bar 55 and the pusher 62, under the action of the contact spring 63, returns the swing-bar 55 approximately to its original position; the contact between the contact spring 63 and the spring 66 is opened.

It is thus seen that, whatever the sense of displacement of the bars 50—50', either in the sense of the arrow $f_2$, or in the sense of the arrow $f_3$, one will always obtain a displacement of the pusher 62 in the sense of the arrow $f_2$.

According to the embodiment described above, the two contact springs 63 and 66 have their contacts opened in the rest position and closed in the working position. It is quite obvious that one could have had two contact springs with their contacts closed in the rest position and opened in the working position. Similarly, one could have used more than two contact springs and have obtained all the possible opening and closing conditions.

It will be noted that one could have only a single horizontal bar instead of two as in the embodiment described; the two abutments 53 and 54 would be provided on the said bar and a lever similar to the swing-bar 55 would be placed under the control of the said bar. The operating principle of the arrangement would be identical.

In the operating example which has just been described, a group of two horizontal bars 50—50' has been selected and clutched. One could also simultaneously select several groups of similar bars arranged one on top of the other as explained previously, and clutch the said bars simultaneously by the operation of the clutch bar 69, either in the sense of the arrow $f_4$, or in the sense of the arrow $f_5$.

Instead of having two groups of two movable bars to be controlled, one could also, without leaving the scope of the invention, have only a single bar for each selecting mechanism or groups of several bars. Similarly, one could also control movable bars when placed vertically or in any other position.

I claim:

1. Control mechanism for selective switches of the type having a plurality of longitudinal shiftable crossbar contact operating members, for example such as those used in crossbar telephone switches, comprising a plurality of bar selecting means one for each bar, a main clutch bar which extends past all the crossbars and is arranged to be oscillated in either direction around its longitudinal axis to control the direction of longitudinal shifting of said crossbars, a pair of clutch levers for each crossbar but normally out of clutching relation with said main clutch bar, resilient means tending to hold the clutch levers in a well defined normal position, first electrically controlled means one for each pair of clutch levers for moving them into clutching relation with the main clutch bar, locking means associated with said clutch levers, additional electrically controlled means for oscillating said clutch bar in one of two directions about its longitudinal axis for causing it to abut against only one of the clutch levers of said moved pair whereby both levers of said pair are moved as a unit by said clutch bar, the one of said moved levers which is not engaged by said clutch bar being moved into locking relation with said locking means whereby the said selected crossbar is held in its shifted position while allowing said main clutch bar to restore to normal when said additional electrically controlled means are inoperative.

2. Control mechanism according to claim 1 in which each of said clutch levers has a member to be engaged by the main clutch bar and also has a locking hook for engaging said locking means, said lock means comprising a selection lever which is operated by said first electrically controlled operating means for interlocking said clutch lever with the associated selection lever.

3. Control mechanism according to claim 1 in which said locking means comprises a selection lever operated by said first electrically controlled operating means and each of said clutch levers has a hook with the hooks of each pair staggered with respect to each other to provide an interlock with the associated selection lever when the latter is operated and regardless of the direction of movement of said pair of clutch levers by said main clutch bar.

4. Control mechanism according to claim 3 in which said first electrically controlled means comprises an electromagnet having a shiftable armature, and in which each of said selection levers has means defining a rounded slot which is engaged by the end of a shiftable lever connected to said armature whereby displacement of said armature causes the associated selection lever to be moved into interlocking relation with the associated pair of clutch levers.

5. Control mechanism according to claim 1 in which each pair of clutch levers has a projection adapted to be engaged by said main clutch bar and between which projections said clutch bar enters when said levers are operated by said first electrically controlled means, said main clutch bar having a profiled edge where it engages a projection on a clutch lever to operate it and frictionally to retain said clutch lever against returning to normal position under control of said resilient means prior to the returning to normal of the other clutch lever which is not engaged by said main clutch bar.

6. Control mechanism according to claim 1 in which said additional electrically controlled means comprises a pair of electromagnet armatures each adapted to be displaced in opposite directions, said clutch bar being provided with a driving mechanism said driving mechanism comprising a connecting rod mechanically joined to said last named electromagnet armatures for displacement in opposite direction, a crank integral with said clutch bar, a member slidably mounted on said connecting rod and linked to said crank for enabling the longitudinal displacement of said connecting rod to be translated into rotary oscillation of said clutch bar.

7. Control mechanism according to claim 1 in which each cross bar is provided with at least one electrical contact set to be controlled by the shifting movement of an associated crossbar said crossbar being provided with a pair of staggered abutments, a two-armed lever, a fixed fulcrum for said lever, said abutments being located respectively in front of and behind one of the ends of said lever arms whereby for a dosplacement of said crossbar in a direction substantially perpendicular to said lever arms in either direction, said lever will always pivot in the same sense around its fulcrum when engaged by either of said abutments.

8. Control mechanism according to claim 1 in which said crossbars are arranged in two vertical groups and said main clutch bar is provided with bar operating diametrically-opposite bar-operating flanges one flange cooperating with the bars of one vertical group to control their shifting and the other flange cooperating with the bars of the other group to control their shifting.

GEORGES XAVIER LENS.

REFERENCES CITED

The following references are of record in the file of this patent:

UNITED STATES PATENTS

| Number | Name | Date |
|---|---|---|
| 1,559,389 | Waller | Oct. 27, 1925 |
| 2,152,551 | Lieb | Mar. 28, 1939 |
| 2,217,230 | Morphet | Oct. 8, 1940 |
| 2,225,252 | Auld | Dec. 17, 1940 |
| 2,237,719 | Tiebel | Apr. 8, 1941 |
| 2,334,943 | Miller | Nov. 23, 1943 |
| 2,460,313 | Taylor | Feb. 1, 1949 |

FOREIGN PATENTS

| Number | Country | Date |
|---|---|---|
| 246,227 | Switzerland | Dec. 31, 1946 |